(12) United States Patent
Jost

(10) Patent No.: US 11,703,095 B2
(45) Date of Patent: Jul. 18, 2023

(54) METHOD FOR DETERMINING AN OUTPUT TORQUE IN A DRIVE SYSTEM CAPABLE OF BEING POWER SHIFTED IN A VEHICLE

(71) Applicant: Schaeffler Technologies AG & Co. KG, Herzogenaurach (DE)

(72) Inventor: Markus Jost, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/628,238

(22) PCT Filed: Aug. 3, 2020

(86) PCT No.: PCT/DE2020/100685
§ 371 (c)(1),
(2) Date: Jan. 19, 2022

(87) PCT Pub. No.: WO2021/023344
PCT Pub. Date: Feb. 11, 2021

(65) Prior Publication Data
US 2022/0268326 A1    Aug. 25, 2022

(30) Foreign Application Priority Data

Aug. 6, 2019 (DE) ..................... 10 2019 121 208.1

(51) Int. Cl.
*F16D 48/06* (2006.01)

(52) U.S. Cl.
CPC .. *F16D 48/062* (2013.01); *F16D 2500/10412* (2013.01); *F16D 2500/3065* (2013.01); *F16D 2500/30421* (2013.01); *F16D 2500/7044* (2013.01); *F16D 2500/7048* (2013.01)

(58) Field of Classification Search
CPC ......... F16D 48/062; F16D 2500/10412; F16D 2500/1045; F16D 2500/30421; F16D 2500/3065; F16D 2500/7044; F16D 2500/7048
See application file for complete search history.

(56) References Cited

U.S. PATENT DOCUMENTS

2015/0308565 A1  10/2015  Asbogard et al.

FOREIGN PATENT DOCUMENTS

| CN | 103062391 A | 4/2013 |
|---|---|---|
| DE | 10247970 A1 | 4/2004 |
| DE | 102007044452 A1 | 4/2008 |
| DE | 102008045629 A1 | 3/2009 |
| DE | 102010054284 A1 | 6/2011 |
| DE | 102011000331 A1 | 7/2012 |
| DE | 102015203279 A1 | 9/2015 |

(Continued)

*Primary Examiner* — Timothy Hannon

(57) ABSTRACT

A method for determining an output torque in a drive system capable of being power shifted in a vehicle includes providing the drive system having a drive unit for transmitting the drive torque, a dual clutch having a first clutch and a second clutch, and a power shift transmission. The power shift transmission has a first gear with a first gear ratio and a second gear with a second gear ratio. The method also includes measuring a first torque transmitted by the first clutch, calculating a distribution of the drive torque to the first clutch and the second clutch using the first torque, and determining the output torque from the distribution of the drive torque.

9 Claims, 1 Drawing Sheet

(56) References Cited

FOREIGN PATENT DOCUMENTS

| DE | 102017124098 A1 | 4/2019 | | |
|----|----|----|----|----|
| DE | 102019125697 A1 | 2/2021 | | |
| FR | 3022601 A1 | 12/2015 | | |
| JP | 2009137461 A | 6/2009 | | |
| JP | 2009257522 A | 11/2009 | | |
| JP | 2010083454 A | 4/2010 | | |
| JP | 2015536428 A | 12/2015 | | |
| WO | WO-2015193592 A1 * | 12/2015 | ............ | F16D 48/06 |

* cited by examiner

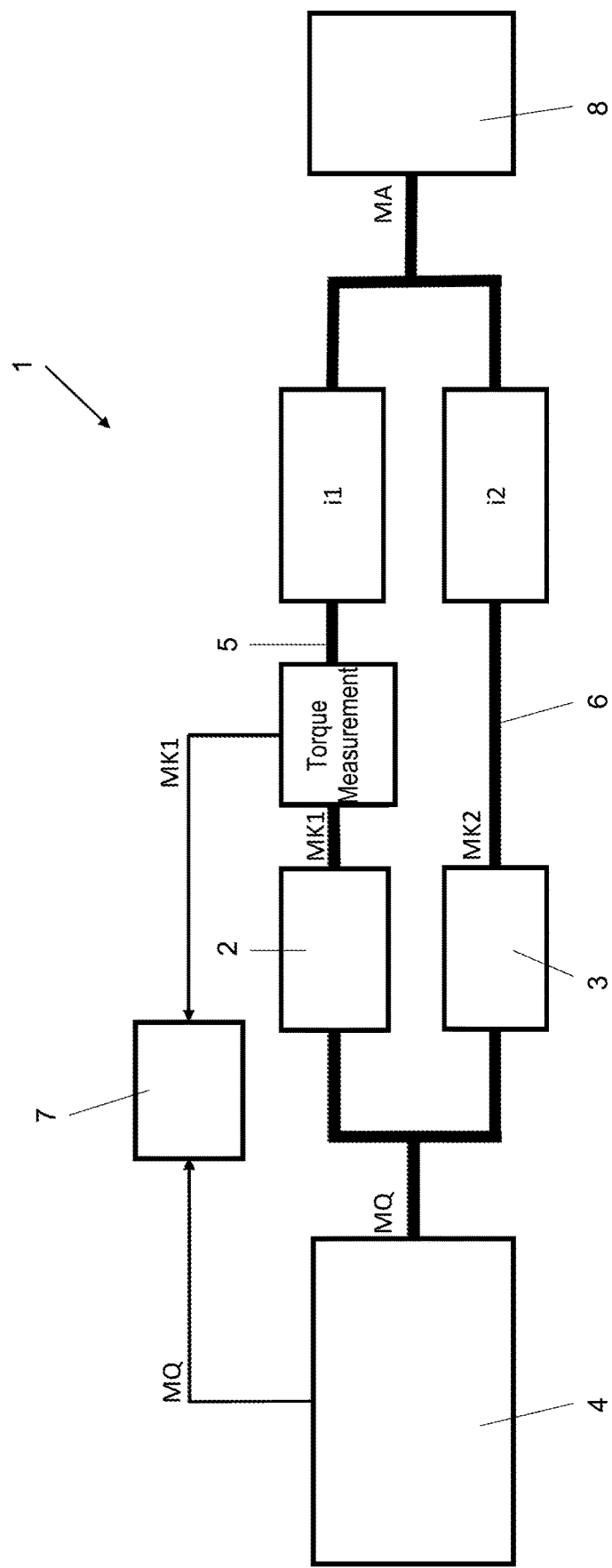

METHOD FOR DETERMINING AN OUTPUT TORQUE IN A DRIVE SYSTEM CAPABLE OF BEING POWER SHIFTED IN A VEHICLE

CROSS-REFERENCE TO RELATED APPLICATIONS

This application is the United States National Phase of PCT Appln. No. PCT/DE2020/100685 filed Aug. 3, 2020, which claims priority to German Application No. DE102019121208.1 filed Aug. 6, 2019, the entire disclosures of which are incorporated by reference herein.

TECHNICAL FIELD

The present disclosure relates to a method for determining an output torque in a drive system capable of being power shifted in a vehicle, which drive system includes a drive unit and a dual clutch and a power shift transmission with at least two gears.

BACKGROUND

From DE 10 2008 045 629 A1, a vehicle is known which has a dual clutch transmission. Each clutch of the dual clutch transmission is assigned its own transmission, in which different gears can be engaged. Power shifting capability is generated frictionally by the dual clutch and the downstream transmission. However, it is problematic to determine the torque transmitted by the respective clutch of the dual clutch with an automotive safety standard ASIL (see ISO 26262), since this is not simple to achieve with the quantities and signals that are normally available. The torque must therefore be measured on both clutches of the dual clutch. Alternatively, the torques of both clutches can be estimated. Both methods can only be carried out using a complex software model.

SUMMARY

The present disclosure provides a method for determining an output torque in a drive system capable of being power shifted in a vehicle, in which drive system the output torque is determined with full inclusion of the automobile safety standard.

According to the disclosure, a torque is measured, which is transmitted by only one of the clutches of the dual clutch, a distribution of a torque of the drive unit onto the two clutches of the dual clutch is inferred from the measurement and, from the distribution, the output torque at one wheel or one axle of the vehicle is determined. This has the advantage that the determination of the output torque is safety-oriented. Despite cost-effective implementation, reliable integration of the automotive safety standard ASIL (Automotive Safety Integrity Level—the safety requirement level specified by ISO 26262 for safety systems in motor vehicles) is possible at all times.

The torque is measured at an output of one of the two clutches of the dual clutch. A second torque measurement on the other clutch of the dual clutch can be dispensed with.

In one embodiment, the torque is measured between the one clutch and the power shift transmission connected downstream of this clutch. This reduces the costs of the method.

In one variant, a torque of the second clutch is determined using the measured torque of the first clutch and the torque specified by the drive unit. This reduces the computational effort required to determine the output torque.

In one embodiment, the output torque specified by the drive unit is measured or estimated. The output torque of the drive unit can normally be determined (calculated/estimated) with the necessary ASIL classification.

The output torque applied to the wheel or an axle of the vehicle is determined from the sum of the measured torque of the first clutch and the calculated torque of the second clutch, and the torques are multiplied beforehand by the respective gear ratio of the power shift transmission assigned to the clutch. Since the gear ratios of the power shift transmission are known, the output torque of the drive system can be easily determined.

In a further embodiment, the drive system includes a single wheel drive or an axle drive, which drives only one axle or one wheel or a dual wheel combination of the vehicle. In this way, the output torque of the wheel or the axle can be determined without having to carry out a torque measurement at both clutch outputs of the dual clutch.

In a further variant, the drive system of the vehicle has one or more individual wheel drives or axle drives. A vehicle can have as many single-wheel drives or axle drives as it has axles or wheels or dual-wheel combinations.

In one embodiment, an electrical machine and/or an internal combustion engine is used as the drive unit of the vehicle.

BRIEF DESCRIPTION OF THE DRAWINGS

The present disclosure allows for numerous embodiments. One of these will be explained in more detail with reference to the FIGURE shown in the drawing.

In the FIGURE:

the single FIGURE shows an exemplary embodiment of the method according to the disclosure.

DETAILED DESCRIPTION

The single FIGURE shows an exemplary embodiment of the method according to the present disclosure on a drive system 1 of a vehicle. The drive system 1 has a first and a second clutch 2, 3, downstream of which a power shift transmission is connected. This power shift transmission is characterized in FIG. 1 by two gear ratios i1 and i2 of the power shift transmission. The gear ratio i1 is downstream of the clutch 2 and the gear ratio i2 is downstream of the clutch 3. A torque source 4 in the form of a drive unit, such as an electric motor or an internal combustion engine or an electric motor and an internal combustion engine, generates a drive torque MQ, which is distributed to the clutches 2 and 3.

In the closed state, the first clutch 2 is connected to a transmission input shaft 5 in a torque-transmitting manner, while the second clutch 3, when it is closed, is coupled to a second transmission input shaft 6 in a torque-transmitting manner. Since the clutches 2, 3 are selectively switchable, either the first transmission input shaft 5 transmits the torque MK1 of the first clutch 2 or the second transmission input shaft 6 transmits the torque MK2 of the second clutch 3 to the transmission with the respective gear ratios i1, i2. The torques MK1 and MK2 are brought together behind the transmission and act as output torque MA on a wheel 8 or an axle of the vehicle. In this case, the drive system 1 forms a single-wheel drive or an axle drive.

In order to determine the output torque MA inexpensively and with little software expenditure, only the torque MK1 of the first clutch 2 is measured. The measurement takes place between the output of the first clutch 2 and the transmission (gear ratio i1). The measured torque MK1 is fed to a logic unit 7, which calculates the torque MK2 of the second clutch 3 with the aid of the drive torque MQ and the measured torque MK1. For this purpose, the current drive torque MQ is estimated or measured and also fed to the logic unit 7. This is carried out with the necessary ASIL classification.

The following applies $$MK2 = MQ - MK1 \qquad (E1)$$

Since the gear ratios i1, i2 of the transmission are known, the output torque MA on the wheel 8 or the axle is determined as follows:

$$MA = MK1 * i1 + MK2 * i2 \qquad (E2)$$

In this way, the output torque MA is determined by means of only one torque measurement on one of the two clutches 2, 3.

REFERENCE NUMERALS

1 Drive system
2 Clutch
3 Clutch
4 Torque source
5 First transmission input shaft
6 Second transmission input shaft
7 Logic unit
8 Wheel/axle

The invention claimed is:

1. A method for determining an output torque in a drive system capable of being power shifted in a vehicle, comprising:
   providing the drive system comprising:
      a drive unit for transmitting a drive torque;
      a dual clutch comprising a first clutch and a second clutch; and
      a power shift transmission comprising:
         a first gear with a first gear ratio; and
         a second gear with a second gear ratio;
   measuring a first torque transmitted by the first clutch;
   calculating a distribution of the drive torque to the first clutch and the second clutch using the first torque; and
   determining the output torque from the distribution of the drive torque.

2. The method of claim 1, wherein the first torque is measured at an output of the first clutch.

3. The method of claim 1, wherein the first torque is measured between the first clutch and the power shift transmission.

4. The method of claim 1 further comprising calculating a second torque transmitted by the second clutch from the first torque and the drive torque.

5. The method of claim 4 wherein the drive torque is measured or estimated.

6. The method of claim 4, wherein the output torque is determined from a sum of:
   the first torque multiplied by the first gear ratio; and
   the second torque multiplied by the second gear ratio.

7. The method of claim 1 wherein the drive system further comprises:
   a single wheel drive; or
   an axle drive, which drives only one axle or one wheel, or a dual wheel combination of the vehicle.

8. The method of claim 7 wherein the drive system comprises a plurality of single wheel drives or axle drives.

9. The method of claim 1 wherein the drive unit is an electrical machine or an internal combustion engine.

* * * * *